(12) United States Patent
Freeman et al.

(10) Patent No.: US 8,523,219 B2
(45) Date of Patent: Sep. 3, 2013

(54) TROLLEY

(76) Inventors: Paul Freeman, Mount Colah (AU);
Philip Fisher, Kahibah (AU)

(*) Notice: Subject to any disclaimer, the term of this patent is extended or adjusted under 35 U.S.C. 154(b) by 144 days.

(21) Appl. No.: 13/260,208

(22) PCT Filed: Feb. 2, 2010

(86) PCT No.: PCT/AU2010/000103
§ 371 (c)(1),
(2), (4) Date: Sep. 23, 2011

(87) PCT Pub. No.: WO2010/111727
PCT Pub. Date: Oct. 7, 2010

(65) Prior Publication Data
US 2012/0013105 A1 Jan. 19, 2012

(30) Foreign Application Priority Data
Mar. 30, 2009 (AU) ................................ 2009901370

(51) Int. Cl.
*B62B 1/00* (2006.01)

(52) U.S. Cl.
USPC .......................................... 280/655; 280/646

(58) Field of Classification Search
USPC ............. 280/40, 47.24, 645, 651–655, 47.17, 280/47.18, 47.23, 47.27
See application file for complete search history.

(56) References Cited

U.S. PATENT DOCUMENTS

| 1,347,466 | A | * | 7/1920 | Raymond | 280/640 |
| 4,793,628 | A | | 12/1988 | Haley, Sr. | 280/641 |
| 4,813,701 | A | | 3/1989 | Balland | |
| 2001/0033070 | A1 | | 10/2001 | Reimers et al. | 280/651 |
| 2006/0214383 | A1 | | 9/2006 | Yoh | |

FOREIGN PATENT DOCUMENTS

| EP | 0206872 B1 | 2/1989 |
| EP | 1 055 581 A1 | 11/2000 |
| FR | 2 559 729 A1 | 8/1985 |
| FR | 2 582 604 A1 | 12/1986 |
| NL | 8104395 A | 4/1983 |
| WO | 01/94179 A1 | 12/2001 |
| WO | WO 03/013937 A1 | 2/2003 |

* cited by examiner

*Primary Examiner* — John Walters
*Assistant Examiner* — James Triggs (57) ABSTRACT

A trolley having a base section with ground engaging parts adapted to move between a collapsed condition into a deployed condition to provide a stable base for the trolley, the ground engaging parts are interconnected for synchronised movement and an upper section that connectively extends above the base section including a coupling intermediate the upper section and base section such that the upper section and base section have synchronised movement and an actuator operatively connected thereto, wherein the motion of the actuator causes the ground engaging parts to move between the collapsed and deployed condition.

12 Claims, 11 Drawing Sheets

TROLLEY

FIELD OF INVENTION

This invention generally relates to a trolley.

BACKGROUND OF INVENTION

Customers at a store, supermarket or shopping centre often require a trolley to transport goods from the store to the destination to offload the goods. This destination may be close, such as the immediate car park or considerably further such as a residential location reached by footpath, road, public transport or a combination of these.

Typically, shopping centres supply the customer with a shopping trolley that may be used within the shopping centre premises. Often, these shopping trolleys will be taken off shopping centre premises by customers that require carriage of goods to their destination. The customer often does not return the trolley as the customer does not require a trolley again until next shopping.

More problematically, if a customer chooses to travel by public transport the customer must carry their goods for a least a portion of their journey. Once at their destination the customer may wish to store the trolley, hence a small lightweight storable trolley would be advantageous.

Further, it is anticipated that supermarkets will phase out plastic bags and require the customer to either pay for the plastic bags or supply their own bags. It is also anticipated that the larger supermarkets will introduce different modes for billing, for example, the customer will be billed as they pass a sensor Thus, there is a need to provide an improved shopping trolley and components for the shopping trolley to alleviate one or more of the aforementioned problems.

SUMMARY OF INVENTION

In one broad form there is provided a trolley including a base section with ground engaging parts adapted to move between a collapsed condition into a deployed condition to provide a stable base for the trolley, wherein the parts are interconnected for synchronised movement.

In one form, the trolley further includes an upper section that connectively extends above the base section and a coupling intermediate the upper section and the base section such that the upper section and base section have synchronised movement.

In another form the trolley includes an actuator operatively connected thereto wherein motion of the actuator causes the parts to move between the collapsed and deployed condition.

In another form the actuator transverses the upper section and the base section via the coupling such that actuator is free to move in a substantially vertical direction.

In another form the trolley includes a sleave the actuator passes internal thereto.

In yet another form the sleave is rigidly fixed coupling allowing the actuator and sleave relative movement.

In yet another form the cross section of the actuator and the sleave are substantially congruent as to provide a light friction fit allowing relative movement.

In one form the base section and the upper section include an elongate support member that operatively transverses between the upper section and base section via the coupling.

In another form the motion of the actuator causes the elongate support member to pivot about the coupling such that the parts move between the collapsed and deployed condition.

In one embodiment the base section of the trolley further includes an inner member operatively connected to the actuator whereby the substantially vertical motion of the actuator is translated to at least one of the parts or the elongate support member.

In another embodiment the base section of the trolley further includes a outer member that operatively connects the parts wherein the outer member includes a locking mechanism whereby the parts are locked into the deployed position.

In one form the support geometric combination of the elongate support members with the inner member and the actuator form a triangular structure.

In another form the trolley further including a plurality of the inner member, the outer member and the elongate support member such as a geometric arrangement of the plurality of the inner, outer and elongate support member with the actuator form a tetrahedron with a vertex at the coupling.

In one embodiment the trolley may have ground engaging parts are in the form of wheels.

In another embodiment the base section includes two sets of wheels wherein one set is located forward corners of the trolley and one set on the reward corners of the trolley.

In another embodiment at least one of the two sets of wheels includes is pivoted such that the trolley may be steered.

In one form the coupling has a pivot point that connects to the elongate support member intermediate its ends.

In another form the coupling is of the form of a collar wherein the pivot point is located on the perimeter whereby the actuator can pass central of the collar.

In another form the collar is substantially square where each face of the square contains a pivot point to operatively connect to the elongate support member.

Preferably, the trolley is used to support a storage compartment, a tray or a bag.

Preferably, the elongate support members further includes a hook, a ridge or a channel to attach the storage compartment, tray or bag.

More preferably, the hook, ridge or channel is located at the top end to the elongate support members.

More Preferably, the storage compartment, tray or bag removable.

More Preferably still, the storage compartment tray or bag has a shape conforming to space provided by the elongate support members.

Preferably, the upper portion of the trolley includes four removable material bags with stiffening elements to retain bag shape and wherein the base has provision to include a further storage medium such as a compartment, a tray or a bag.

BRIEF DESCRIPTIONS OF THE DRAWINGS

The invention is described, by way of non-limiting example only, with reference to the accompanying drawings, in which;

FIG. 5 includes FIG. 5a, that illustrates a perspective view, and FIG. 5b that that illustrates a side view, of the shopping trolley with a lower tray;

FIG. 8 includes FIG. 8a, that illustrates a front wheel assembly of the trolley, and FIG. 8b that illustrates a rear wheel assembly of the trolley;

FIG. 10 includes FIG. 10a, that illustrates an end configuration of an actuator, and FIG. 10b, that illustrates the bag handle and cut-outs, of the trolley; and FIG. 11 includes FIG. 11a, that illustrates a side view, and FIG. 11b that includes a plan view, of a coupling assembly of the trolley.

DETAILED DESCRIPTION OF THE INVENTION

Figure 1:
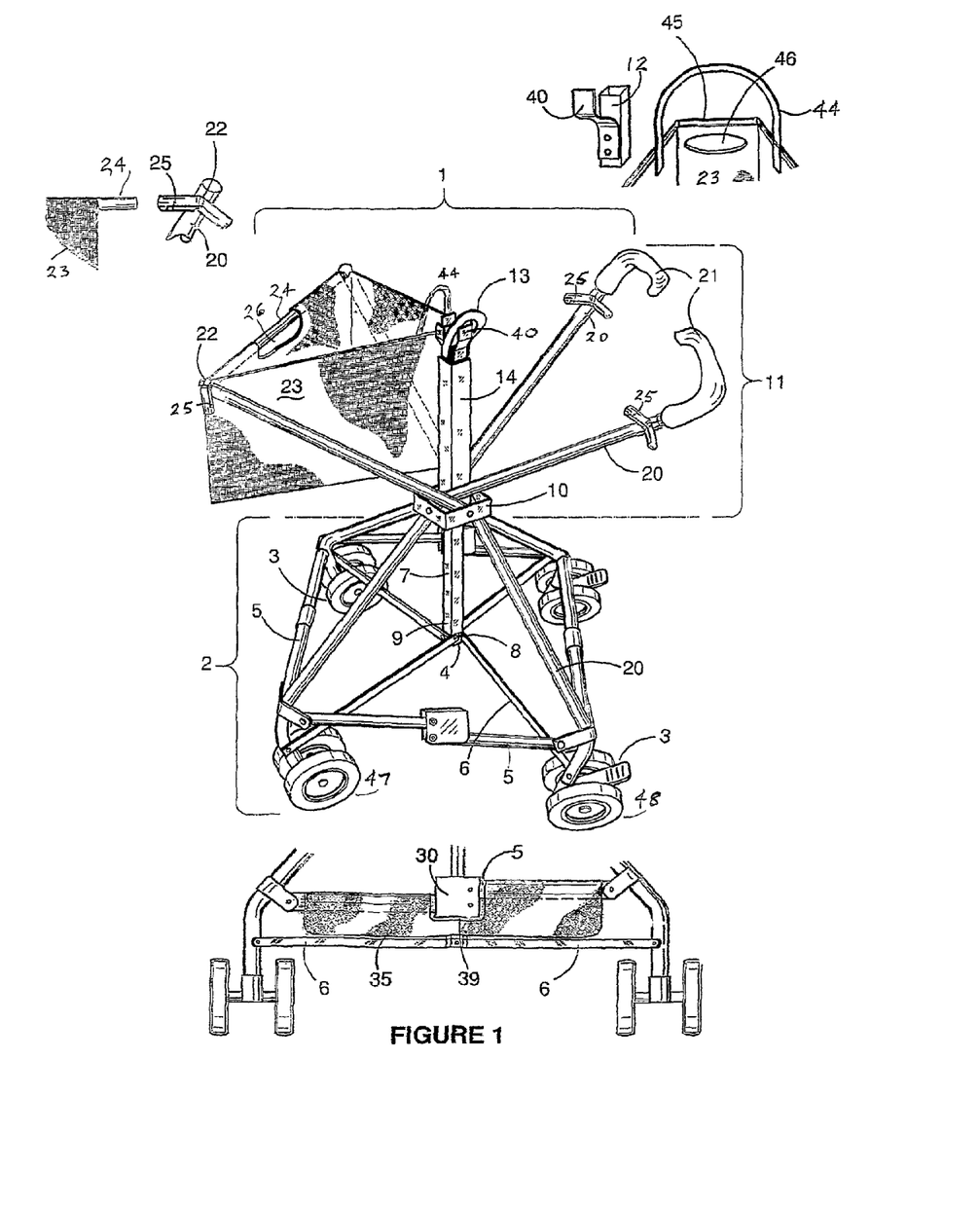
FIG. 1 illustrates a perspective view of a trolley.

Referring to FIG. 1 the trolley 1, which is preferably in the form of a shopping trolley, is shown as including a base section 2 with ground engaging parts 3. The base section 3 is formed of an articulated base frame 4 which includes outer connecting members 5 and inner connecting members 6 wherein the inner connecting members 6 hingedly joined to an actuator 7 at hinge points 8. The actuator 7 is provided in a substantially vertical orientation and extends from a lower end 9 to a coupling 10 and through an upper section 11 of the trolley. The top 12 of the actuator 7 has a strap 13 and between the coupling 10 and the strap 13 the actuator 7 is housed by a sleeve 14. Elongated support members 20, which form part of the base from 4, extend upwardly from the ground engaging parts 3 via the coupling 10 to provide support for handles 21 and attachment points 22 for a shopping bag 23.

The geometric combination of each elongate support member 20, inner connecting member 6 and the actuator 7, as shown in FIG. 1, forms a triangular structure. The combination inner members 6, the outer connecting members 5 and the elongate support members 20 are arranged such that a plurality of generally tetrahedral structures, with a vertex proximal to the coupling 10, are formed to provide the trolley 1 with a substantially rigid base section 2.

Figure 2:
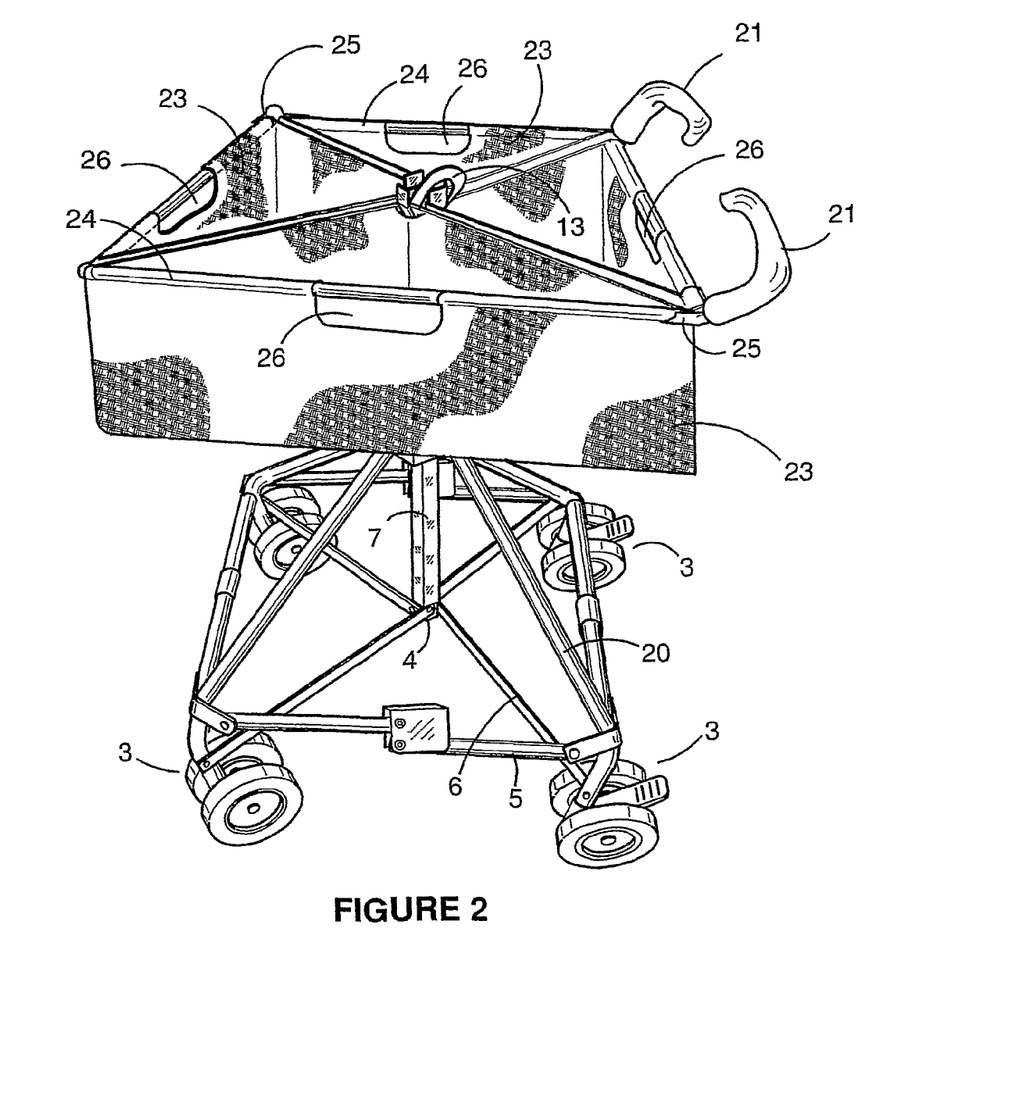
FIG. 2 illustrates another perspective view of the trolley of FIG. 1 with four shopping bags suspended from an upper section of the trolley.

FIG. 2 shows the trolley with four shopping bags 23 that are fitted with a stiffening element 24 that is detachably mounted to associated corner support 25. The shopping bags 23 also include cut-out 26 from which the bag 23 can be carried or hung at a cashiering station of a shopping centre, or the like, which would normally accommodate disposable plastic shopping bags.

Figure 3:
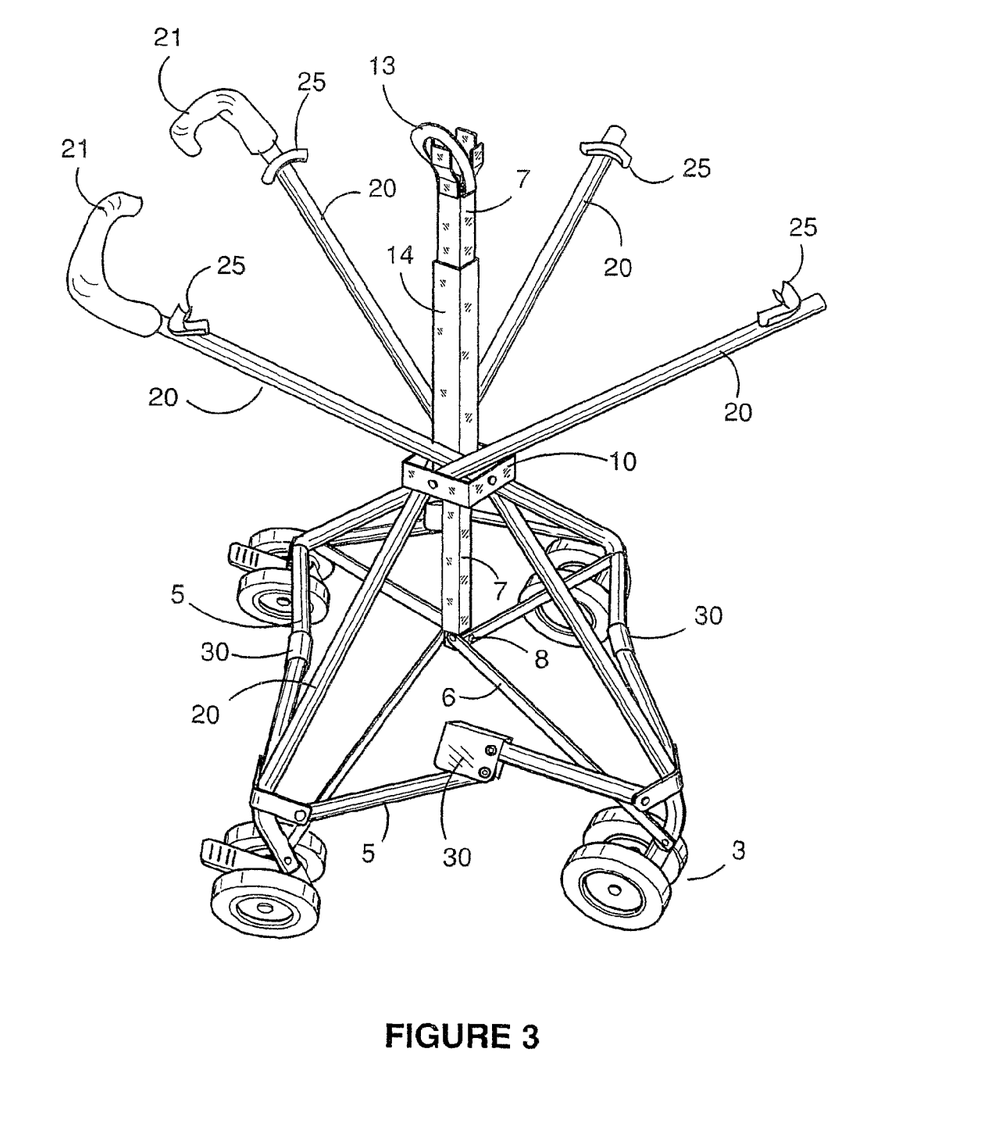
FIG. 3 illustrates a perspective view of the trolley of FIG. 1, excluding the bags or storage compartments, shown in a partially collapsed configuration.
Figure 4:
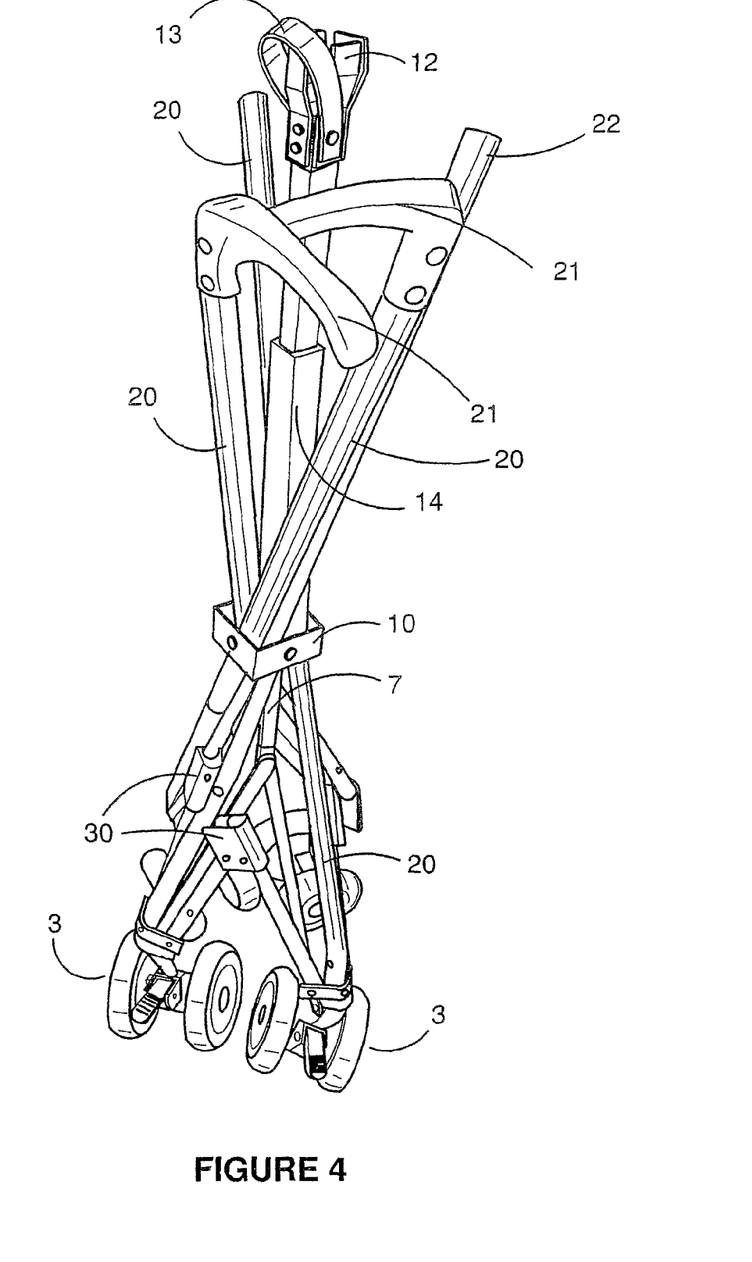
FIG. 4 illustrates a perspective view of the trolley shown in the fully collapsed condition.

Referring to FIG. 3 the trolley 1 is illustrated in the partially collapsed condition. To move the trolley, from the condition shown in FIG. 1 to that of FIG. 3, the bags 23 are firstly removed then locking mechanisms 30, which are provided intermediate ends the outer connecting member 5, are released. The actuator 7 is pulled upwardly by the strap 13 so that the inner members 6 pivot about hinge points 8 allowing the upward movement of actuator 7. The action of inner members 6 causes the ground engaging parts 3 to pivot with elongate members 20 about the coupling 10 to thereby allow the trolley 1 to move toward the collapsed condition as shown in FIG. 4. In this manner, the action of the actuator 7 creates synchronous movement of inner connecting members 6, outer connecting members 5 and elongate members 20.

Referring to FIG. 4, the trolley 1 is shown in the collapsed condition wherein the actuator 7 is fully extended from the sleeve 14 and wherein the elongate support members 20 are pivoted about the coupling 10 such that distal ends both above and below the coupling 10 are brought together, hence the handles 21, attachment points 22 and ground engaging parts 3 are brought together to the collapsed condition.

Figure 5A:
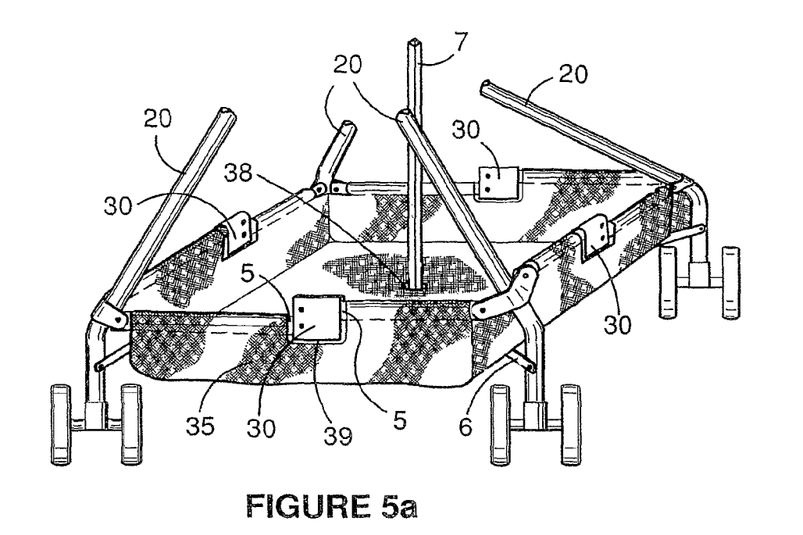
Figure 5B:
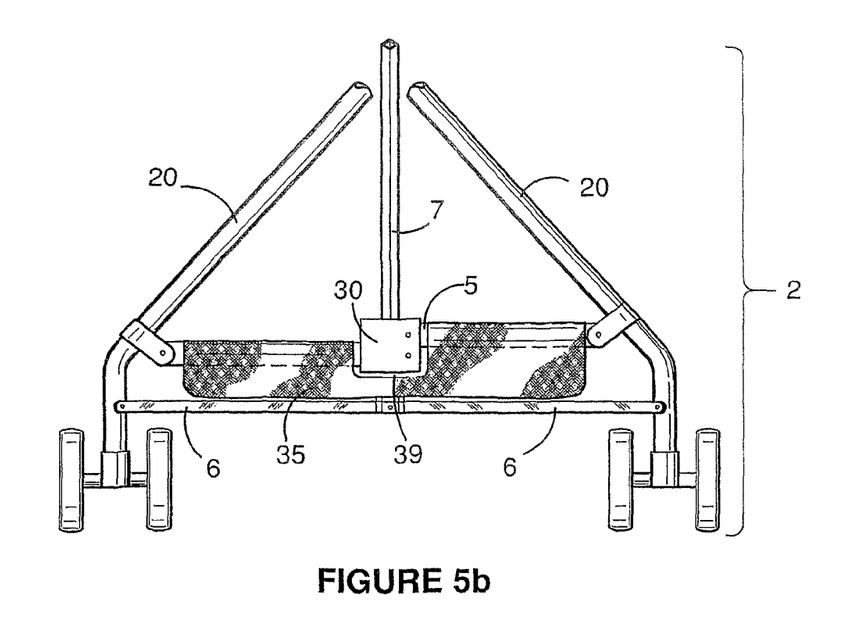

Referring to FIG. 5, the base section 2 of the trolley 1 is shown with a fabric tray 35 wherein the top 36 of the outer perimeter 37 of the fabric tray 35 is fixed to the outer connecting members 5 and the centre 38 is fixed to the bottom of the actuator 7 such that fabric tray 35 rests upon the inner connecting members 6. The vertical separation between the inner connecting members 6 and outer connecting members 5 determines the depth of the fabric tray 35. The fabric tray 35 has a cut-out 39 to allow the articulation of the locking mechanism 30.

Figure 6:
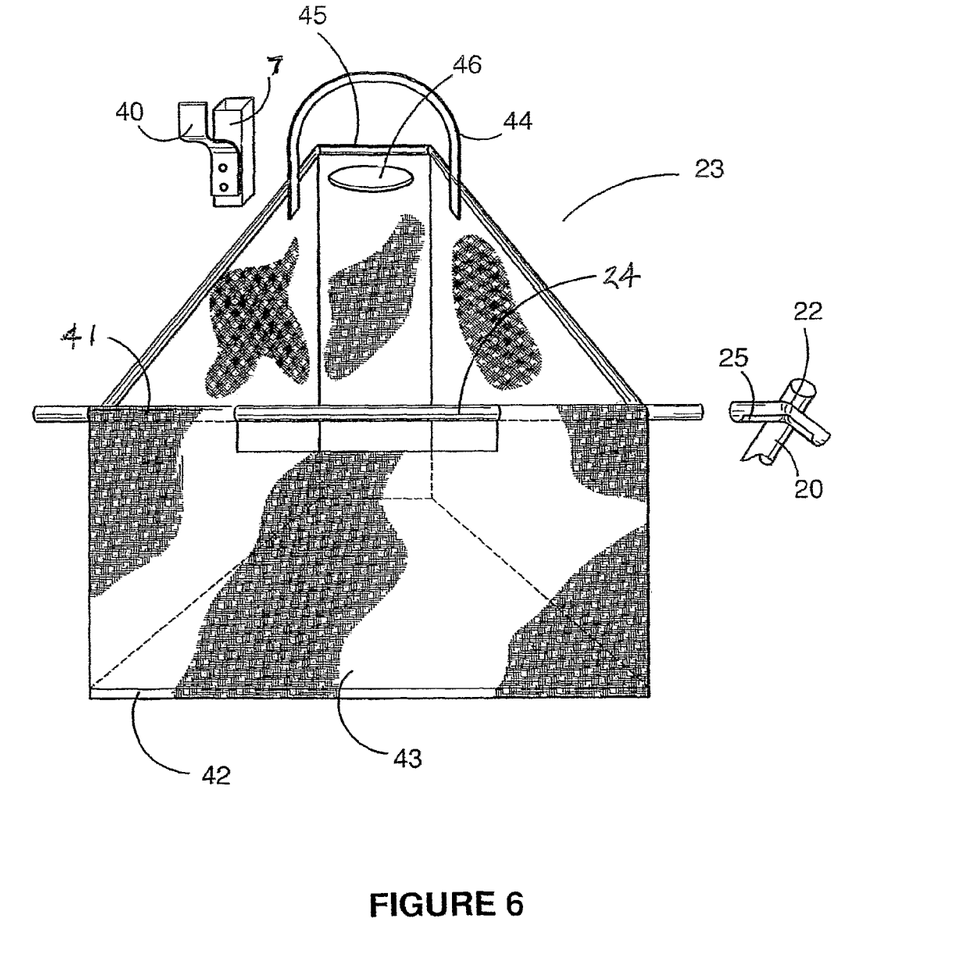
FIG. 6 illustrates a bag for use with the trolley.

Referring to FIG. 6, the shopping bag 23 is shown in more detail as having a substantially triangular shape with a second opening for attachment to a hook 40, or the like, projecting from the actuator 7. The upper outer perimeter 41 of the shopping bag 23 includes a stiffening element 24 adapted to provide removable attachment with the corner support 25 and the lower outer perimeter 42 has fabric reinforcement 43. The shopping bag 23 has a handle 44 for lifting the bag into and out of the trolley 1 and the region between the handle 44 and the upper inner edge 45 of the bag 23 that is most proximal to the actuator 7 has a cut-out 46 for attachment to the hook 40.

Figure 7:
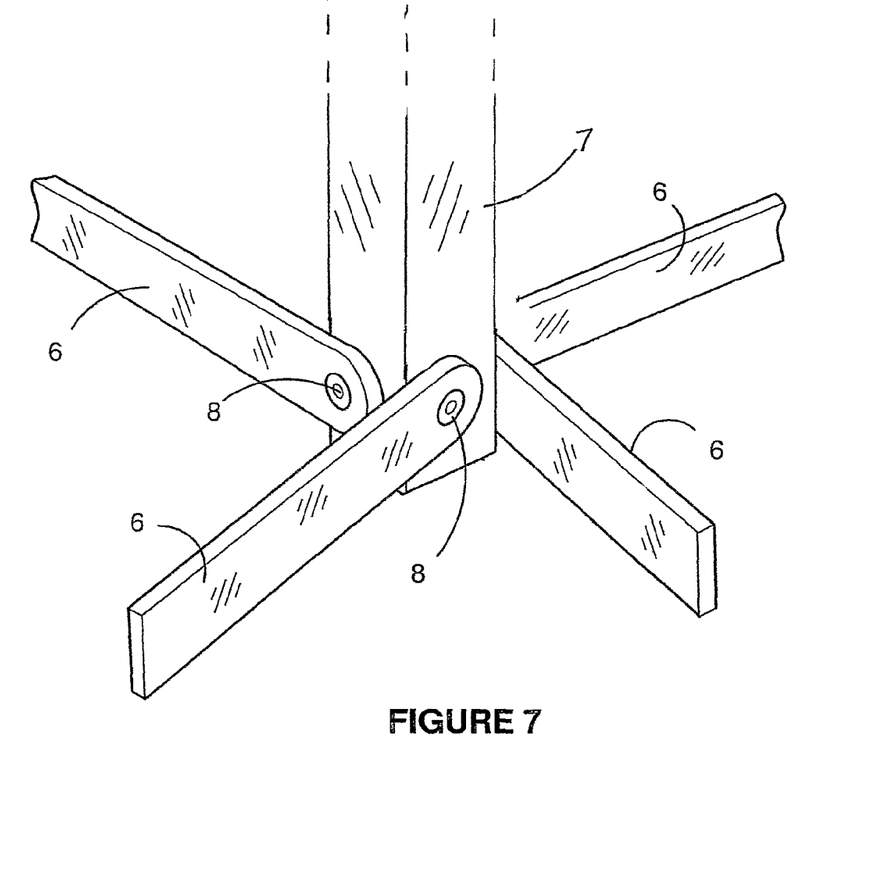
FIG. 7 illustrates a lower hinge assembly of the trolley.

Referring to FIG. 7, connection of the actuator 7 to the inner connecting members 6 is shown more clearly. The upward motion of the actuator 7 creates tension in the inner connecting members 8 to draw the ground engaging parts 3 inwardly to facilitate the movement toward the collapsed condition as shown in FIG. 4.

Figure 8A:
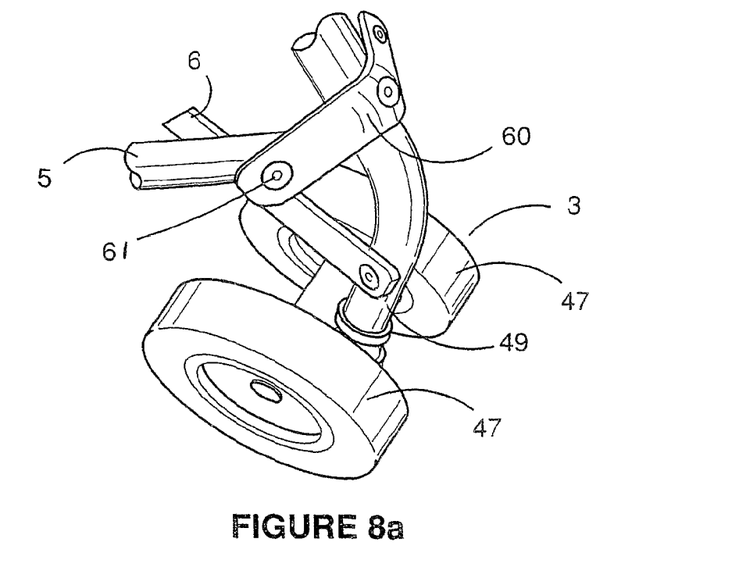
Figure 8B:
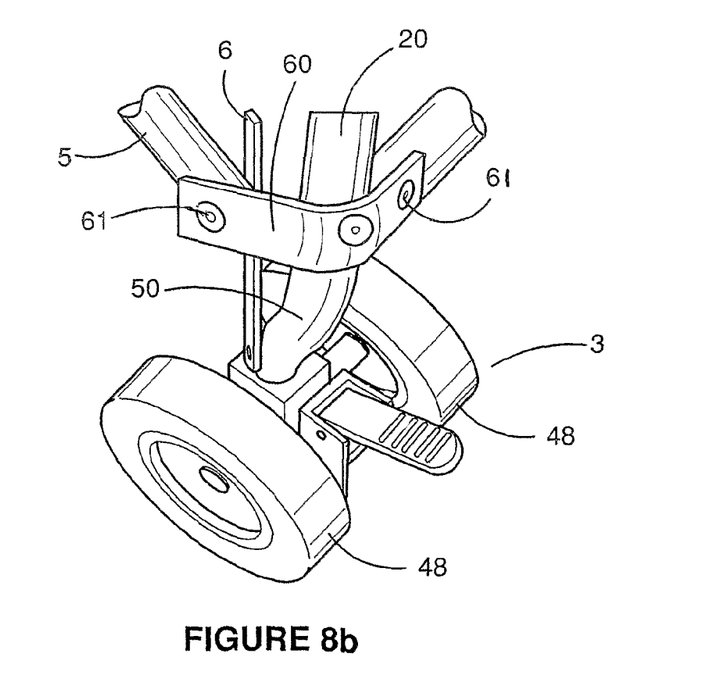

Referring to FIG. 8, the ground engaging parts 3 are shown here in the form of front wheels 47 and rear wheels 48. The front wheels 47, are distinguished as such since they are opposite the handles 21 shown in FIG. 1. The front wheels 47 are pivotally connected to an associated end 49 of the elongate support members 20 to allow the trolley to be steered. The rear wheels 48 are rigidly connected to the associated end 50 of the elongate support member 20. The region proximal to ends 49 and 50 of the elongate support. Members 20 have been bent into substantially vertical orientation to allow attachment of the front wheels 47 and rear wheels 48. The center of a bridging element 60 is connected to the elongate support member 20 and the ends of the bridging element 60 are pivotly connected at pivot points 61 to the outer connecting members 5 of the base section 2.

Figure 9:
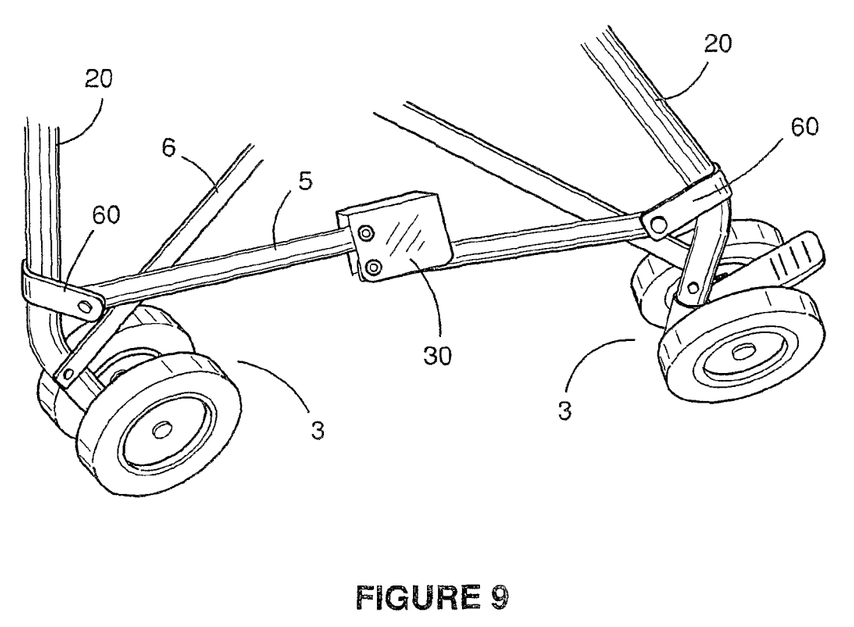
FIG. 9 illustrates a locking mechanism of the trolley.

FIG. 9 provides further detail of locking mechanism 30 located intermediate the ends of the outer connecting members 5. The outer connecting members are pivotally joined to the bridging element 60 such that when the locking mechanisms 30 are locked the ground engaging parts 3 are held in the deployed position, as shown in FIG. 1.

Figure 10A:
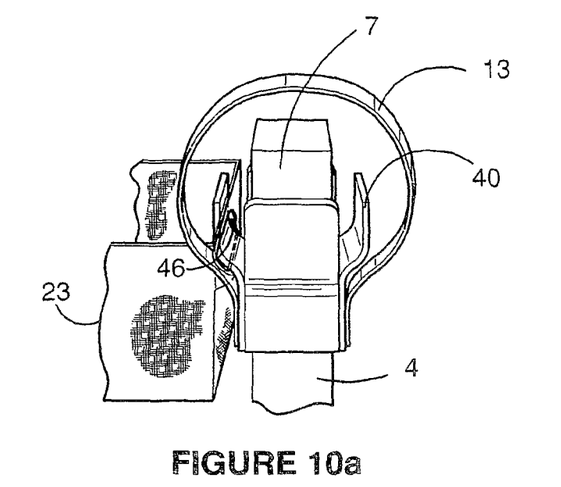
Figure 10B:
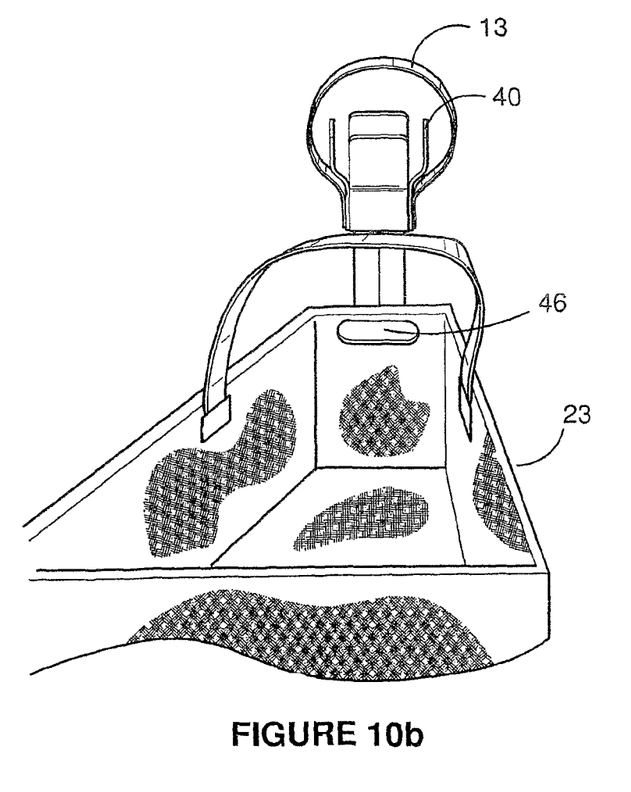

FIG. 10 provides further detail of the actuator 7 and attached strap 13 as shown in FIG. 1. The top of the actuator 12 has both the strap 13 to operate the actuator 7 and the hooks 40 from which the shopping bags 23 are hung.

Figure 11A:
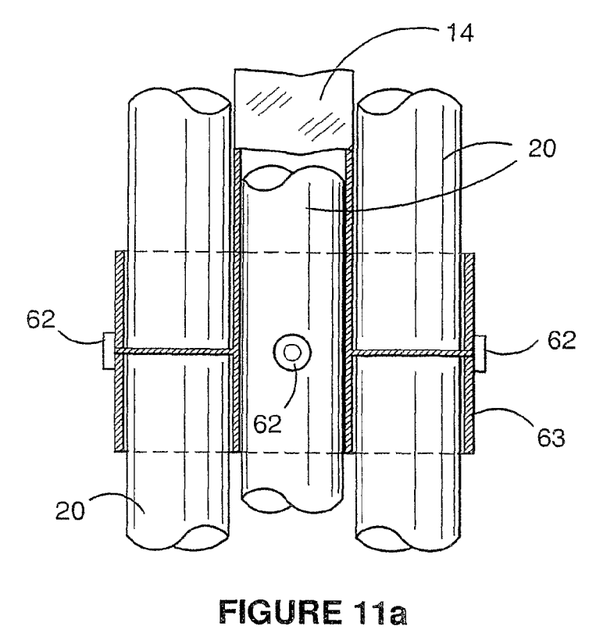
Figure 11B:
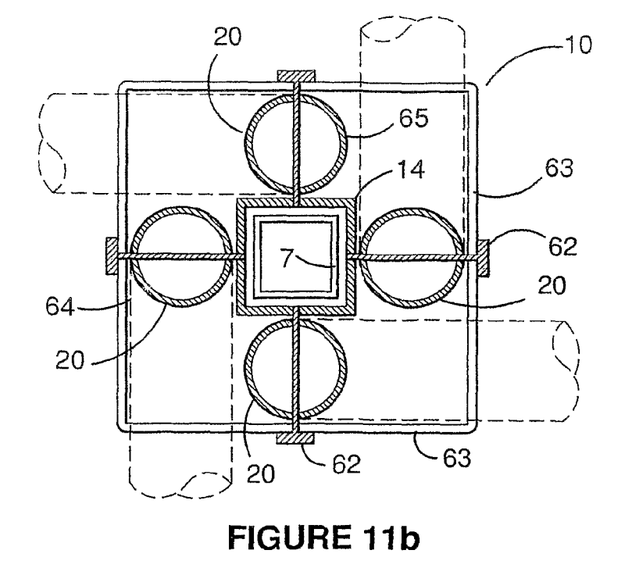

Referring to FIG. 11, the coupling 10 has a substantially square cross section with four pivot points 62 arranged central to each of the four faces 63 so as to provide pivotal connection with the elongate support members 20. Each of the four faces 63 has an inside planar surface 64 substantially tangential to circular cross section 65 of the elongate support members 20 that transverses therein.

The sleeve 14 has a square cross section an vertical axis collocated with that of the coupling 10. The sides of the sleeve 14 are parallel to the coupling 10 and the distance between the sides of the sleeve 14 and the sides of the coupling 10 is approximately equal to the outer diameter of the cross section 65 of elongate support member 20. This allows the elongate support members 20 to pass in the clearance space between the sleeve 14 and the coupling 10.

The actuator 7 has a cross section substantially matched to the cross section of the sleeve 14 such that the outside faces of the actuator 7 are parallel to the inside faces of the sleeve 14. The sleeve 14 and the actuator 7 have a light friction fit such that they are free to move.

The pivot points 62 allow the elongate support members 20 to pivot when the trolley 1 is moved between the deployed state, as shown in FIG. 1 and the collapsed state, as shown in FIG. 4. As the trolley 1 is deployed, the elongate members 20 pivot about the pivot points 62 reducing the clearance between the periphery of the coupling 10 and the elongate members 20 until the two abut to prevent further relative movement.

A folding trolley as been described with the movement between the collapsed condition and the deployed condition facilitated through the use of an actuator, the collapsed condition provides the advantage of ease of portability and storage. The trolley structure may be fabricated from aluminium and/or other lightweight components to give the overall structure a light weight and further ease of portability. The trolley structure incorporates removable shopping bags that may be removed for packing or storage, advantageously each bag is relatively small in size to allow ease of handling when at, for example, a shopping centre cashier or unloading the trolley in a vehicle. Further, in the future as plastic bags may be phased out or incur a fee for use, it may become advantageous to have a trolley with detachable reusable bags.

The invention has been described by way of non-limiting example only and many modifications and variations may be made thereto without departing from the spirit and scope of the invention described.

List of Parts
  1. Trolley
  2. Base Section
  3. Ground Engaging Parts
  4. Articulated Frame
  5. Outer Connecting Members
  6. Inner Connecting Members
  7. Actuator
  8. Hinge Points
  9. Lower End
  10. Coupling
  11. Upper Section
  12. Top of the Actuator
  13. Strap
  14. Sleeve
  20. Elongate Support Members
  21. Handles
  22. Attachment points
  23. Shopping Bag
  24. Stiffening Element
  25. Corner Support
  26. Cut-out
  30. Locking Mechanism
  35. Fabric Tray
  36. Top of the Outer Perimeter of the Fabric Tray
  37. Outer Perimeter of the Fabric Tray
  38. Centre of Fabric Tray
  39. Cut-out
  40. Hook
  41. Upper Perimeter
  42. Lower Perimeter
  43. Fabric Reinforcement
  44. Bag Handle
  45. Upper Inner Edge
  46. Cut-out
  47. Front Wheels
  48. Rear Wheels
  49. Ends
  50. Ends
  60. Bridging Element
  61. Ends
  62. Pivot Points
  63. Face for Coupling
  64. Inside Surface of Coupling
  65. Circular Cross Section

The invention claimed is:

1. A trolley comprising:
   A base section with ground engaging parts adapted to move between a collapsed condition into a deployed condition to provide a stable base for the trolley, wherein the ground engaging parts are interconnected for synchronised movement;
   an upper section that connectively extends above the base section;
   a coupling intermediate the upper section and base section such that the upper section and base section have synchronised movement;
   an actuator operatively connected thereto, wherein the motion of the actuator causes the ground engaging parts to move between the collapsed and deployed condition, and
   wherein the base section and the upper section includes elongate support members that operatively transverse between the upper section and the base section via the coupling, and wherein the base section further includes:
   inner members operatively connected to the actuator whereby a substantially vertical motion of the actuator is translated to at least one of the ground engaging parts or the elongate support member;
   outer members that operatively connect the ground engaging parts; and
   a locking mechanism whereby the ground engaging parts are lockable into the deployed position, and
   wherein a geometric combination of the elongate support members, the inner members and the actuator form a triangular structure.

2. The trolley of claim 1 wherein the coupling has pivot points that connect to the elongate support members intermediate ends thereof.

3. The trolley of claim 2 wherein the coupling is of the form of a collar and wherein the pivot points are located on a perimeter thereof and whereby the actuator can pass central to the collar.

4. The trolley of claim 3 wherein the collar is substantially square and wherein each face of the square contains a pivot point to operatively connect to an elongate support member.

5. The trolley of claim 3 wherein a sleeve is rigidly fixed to the coupling allowing the actuator relative movement.

6. The trolley of claim 5 wherein a cross section of the actuator and sleeve are substantially congruent as to provide a light friction fit allowing relative movement.

7. The trolley of claim 1 wherein the base section includes two sets of wheels and wherein one set of wheels is located at the forward corners of the trolley and one set of wheels is located at the rearward corners of the trolley.

8. The trolley of claim 7 wherein at least one of the two sets of wheels is pivotable such that the trolley may be steered.

9. The trolley of claim 1 wherein the upper section includes four removable material bags with stiffening elements to retain a bag shape; and wherein the base section has provision to include a further storage such as a tray.

10. The trolley of claim 9 wherein at least one of the upper section of the elongate support members includes a hook to attach the bag.

11. The trolley of claim 1 wherein the base section includes a plurality of inner connecting members and a plurality of outer locking members, the inner connecting members connected to a lower end of the actuator and the outer locking members to create four triangular shapes within a square perimeter when the trolley is in the deployed condition.

12. The trolley of claim 1 further including a plurality of inner members, a plurality of outer members and a plurality of elongate support members such that a geometric arrangement of the plurality of inner members, the plurality of outer members and the plurality of elongate support members with the actuator form a tetrahedron with a vertex at the coupling.

* * * * *